April 21, 1942.    R. N. CHÉRON    2,280,509
MEANS FOR ASSEMBLING TUBULAR ELEMENTS
Filed March 29, 1940    3 Sheets-Sheet 1

INVENTOR
René Nicolas Chéron
his ATTY.

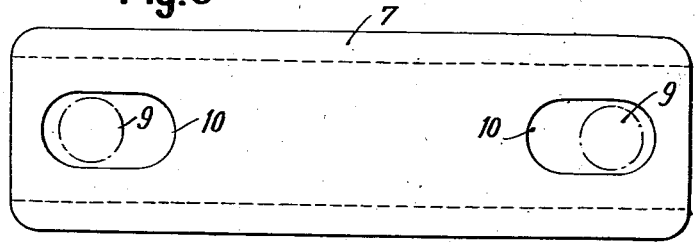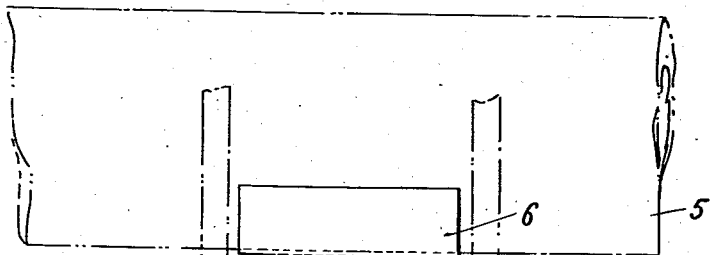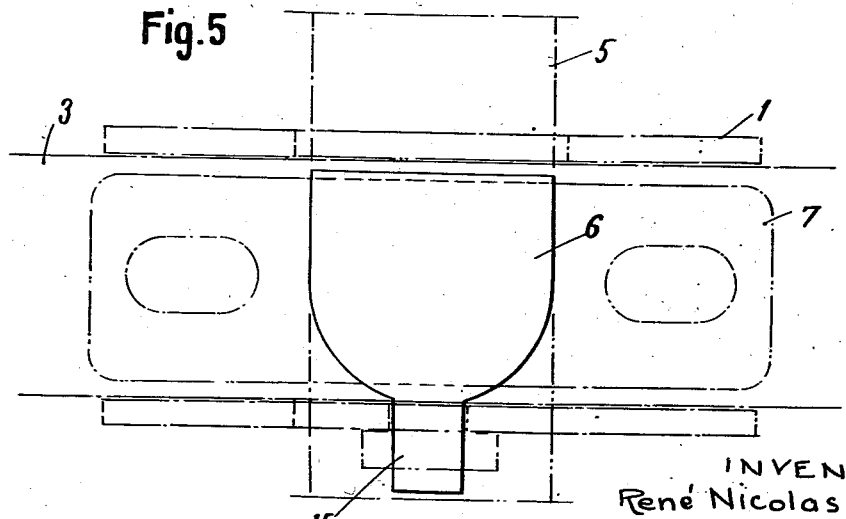

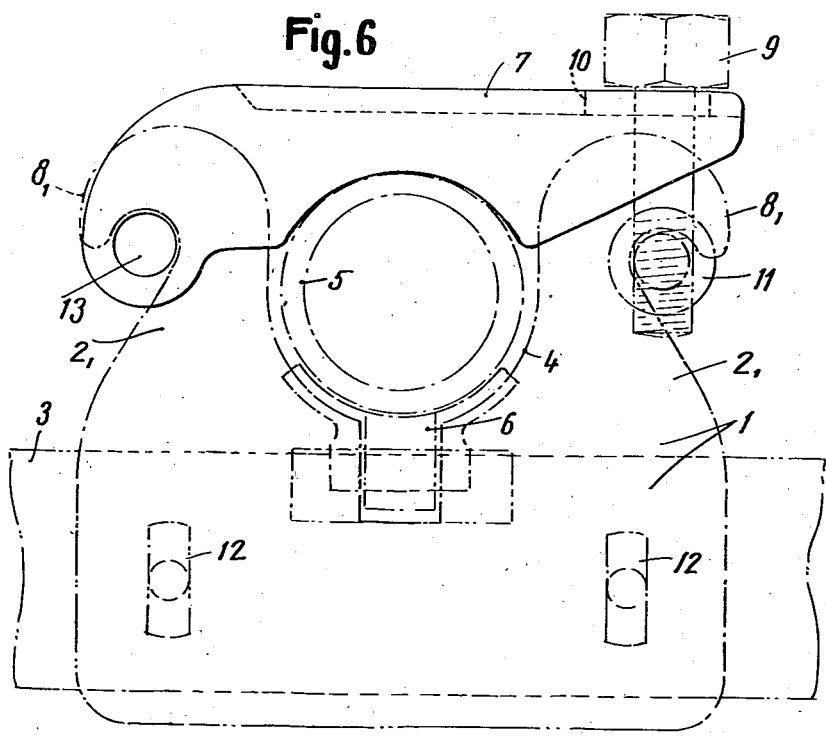
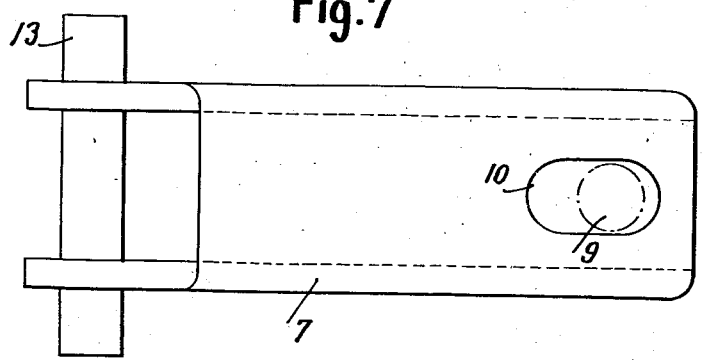

Patented Apr. 21, 1942

2,280,509

UNITED STATES PATENT OFFICE 2,280,509

MEANS FOR ASSEMBLING TUBULAR ELEMENTS

René Nicolas Chéron, Juan-les-Pins, Alpes-Maritimes, France

Application March 29, 1940, Serial No. 326,564
In France May 3, 1939

1 Claim. (Cl. 287—54)

The object of the present invention is to improve the couplings or unions for joining together two tubular elements of a scaffolding, the coupling being of such a nature as to facilitate and accelerate assembling and dismantling.

A further object of the invention is to improve these unions in such a manner as to obviate crushing of the tubular elements of the scaffolding.

An improved union according to the invention exhibits the characteristics set forth in the following description and defined in the claim appended thereto.

Unions for quick disengagement according to the invention are illustrated by way of example in the accompanying drawings, in which Figure 1 is a view in elevation of a union according to the invention connecting two tubular elements to one another;

Figure 3 is a plan view of the cap of this union;

Figure 4 is a view in elevation of a mold interposed between the two tubes;

Figure 5 is a plan view of this mold;

Figure 6 is a view in elevation of another union according to a modification of the invention; and Figure 7 is a plan view of the cap of this modification.

Figure 1:
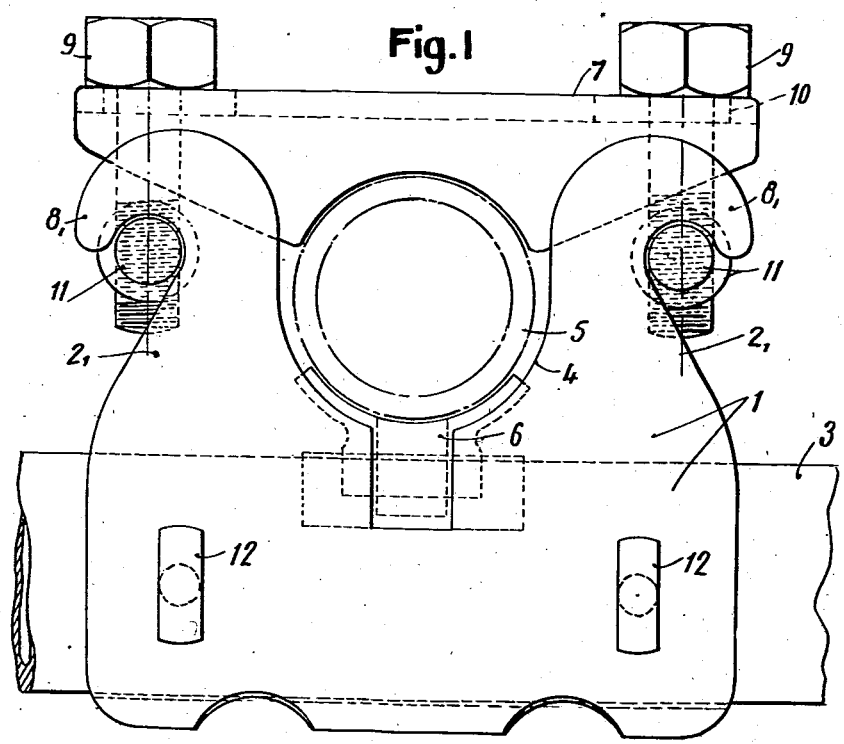
Figure 2:
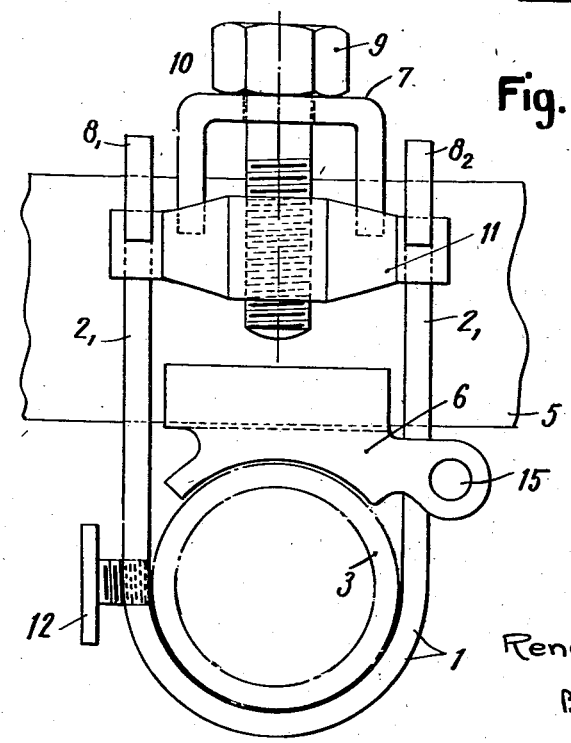
Figure 2 is an end view of this union.

The readily disengageable union illustrated in Figures 1 to 5 comprises a U-shaped central stirrup 1, which engages underneath with the lower tube 3. This central stirrup 1 has at each end two branches $2_1$ and $2_2$, terminating in their upper portions in the form of hooks $8_1$, $8_2$, of such conformation as to provide a lodgment 4 for the upper tube 5.

This central member 1 may advantageously be stamped and swaged from a sheet of mild steel of a thickness of 5 millimeters for example.

A mold 6 which exactly fits the profile of the tubes 3 and 5 is lodged between these tubes, and thus obviates any deterioration of one under the pressure of the other. This mold, made preferably of cast steel, pivots about a pin 15 fixed at two points by autogenous welding to the central member 1.

A cap 7 of U-shaped cross section fits snugly by its two branches to the upper tube 5. This cap 7 may advantageously be stamped and swaged from a sheet of mild steel of a thickness of 5 millimeters for example.

The cap 7 is connected in a readily detachable manner to the central stirrup 1 by the aid of bolts 9, the shanks of which engage in elongated gaps 10 in this cap, and which are screwed on the other hand into a cross bar 11, which thus forms a nut.

The ends of this cross bar engage underneath the hooks $8_1$, $8_2$ of the central stirrup 1.

The assembling of this union is effected in the following manner: The mold 6 is interposed between the tubes 3 and 5 that are to be connected with one another. The central stirrup 1 is engaged beneath the lower tube 3, and is held in place by the aid of set screws 12, which pass through the central stirrup and press with their ends upon the lower tube 3. The cap 7 is then engaged upon the upper tube 5, while the cross bars 11 are engaged underneath the hooks $8_1$, $8_2$ of the central stirrup 1. The bolts 9 are then tightened so as to bring the cap 7 and the central stirrup 1 closer together, thereby ensuring the gripping of the two tubular elements 3 and 5 between this cap 7 and the inner end of the central stirrup 1.

The central stirrup 1 and the cap 7 can easily be made at the same time from pressed steel, thereby enabling sound members of light weight to be obtained, without flaws or cracks, these members thus giving a guarantee of absolute stability at every union.

Furthermore the connection between the two tubes 3 and 5 is obtained by the aid of a single unit, thereby further simplifying manufacture and assembling.

Numerous modifications may be made in the union described above by way of example. In particular the mode of detachable connection between the cap 7 and the central stirrup 1 may be modified; the hooks $8_1$, $8_2$ may alternatively be arranged upon the central stirrup 1, either on the outside of this piece (Figure 1) or on the inside of this piece, or one on the outside and one on the inside.

Figures 6 and 7 show a modification of the invention in which the cap exhibits a particular arrangement. The cap 7 is provided at its extremity with a joint pin 13, and at its other extremity with a bolt 9 engaging by its shank in an elongated gap 10 in the cap, and screwed into a cross bar 11. This joint pin 13 and this cross bar 11 engage respectively in the hooks $8_1$ and the central stirrup 1.

The assembling of the union of Figures 6 and 7 is effected under conditions just like those already described with reference to the Figures 1 to 5.

What I claim is:

A union for connecting two scaffold pipes, said union comprising a U-shaped bracket plate to carry one of the pipes, projections disposed on the corner of said bracket plate, said projections forming two trough shaped bearings to carry the second pipe in a direction substantially at right angles to the first pipe, an elongated cap disposed between said projections and substantially parallel to the longitudinal axis of the curve of said U-shaped bracket plate, said cap having a base curved to rest upon the top of the second pipe, means to connect one end of said cap to the two adjacent projections, the other two projections having hooked portions facing downwardly and outwardly, a bolt projecting through the second end of said cap and free for pivotal movement relative therewith and an elongated nut hooking under said hooked portions, said nut being disposed for cooperation with said bolt.

RENÉ NICOLAS CHÉRON.